E. SURCOUF.
PROPULSION OF AIRSHIPS.
APPLICATION FILED NOV. 13, 1909.

1,019,283.

Patented Mar. 5, 1912.

Witnesses
M. W. Day
L. A. Price

Inventor
Edouard Surcouf
By Wm E. Boulter
Attorney

UNITED STATES PATENT OFFICE.

EDOUARD SURCOUF, OF BILLANCOURT, FRANCE, ASSIGNOR TO SOCIÉTÉ ANONYME "ASTRA," OF BILLANCOURT, FRANCE.

PROPULSION OF AIRSHIPS.

1,019,283.  Specification of Letters Patent.  Patented Mar. 5, 1912.

Application filed November 13, 1909. Serial No. 527,791.

*To all whom it may concern:*

Be it known that I, EDOUARD SURCOUF, a citizen of the French Republic, residing at Billancourt, Seine, France, have invented certain new and useful Improvements in the Propulsion of Airships, of which the following is a specification.

It is well known that it is advisable to make the propelling device for airships of two motor groups: one of very large power acting on a propelling group with high efficiency, and the other of smaller power which can be considered as an auxiliary or emergency motor, operating one or more secondary propelling groups (each motor—or propelling group comprising if desired only one unit). In normal working, the high efficiency motor generally drives the main propelling group for insuring the propulsion of the air-ship, the secondary motor being operated only in case of an accident to the principal motor; these two motors operating their respective propellers can, however, be worked simultaneously, so as to add together their power and to obtain a greater speed of travel. It is, however, advisable to foresee the case when one of the propelling groups will be put out of action, and where at the same time the motor operating the second group will be damaged. In that case, in fact, if no special part for utilizing the still active organs is provided, the airship will be derelict, as none of the driving or propelling parts of the same will be able to insure the advance of the balloon, and enable it to keep the direction or at least to get sufficient deviation for resisting currents of air and for preparing for landing.

This invention has for its object a system of transmission gear for airships, enabling each propelling group to be driven by its own motor, the other propelling motor group being idle or each propelling group to be operated by the motor group which in normal working drives the other propelling group, or one of the said propelling groups to be driven by the two motor groups connected together, or the two propelling groups by one of the motor groups, or finally the two propelling groups by the two motor groups coupled together.

Figure 1:
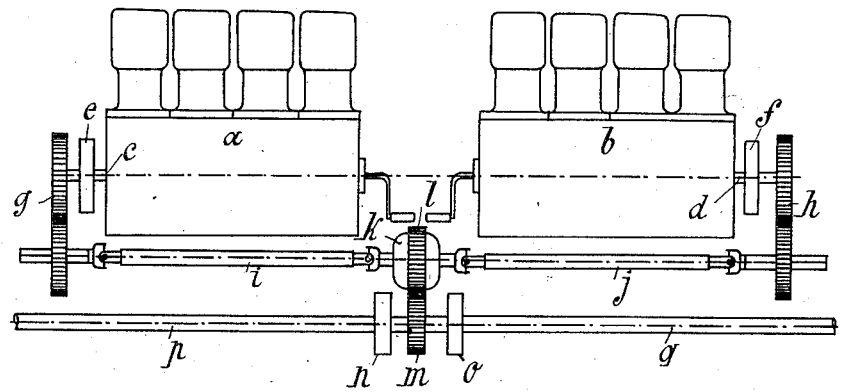
Figure 2:
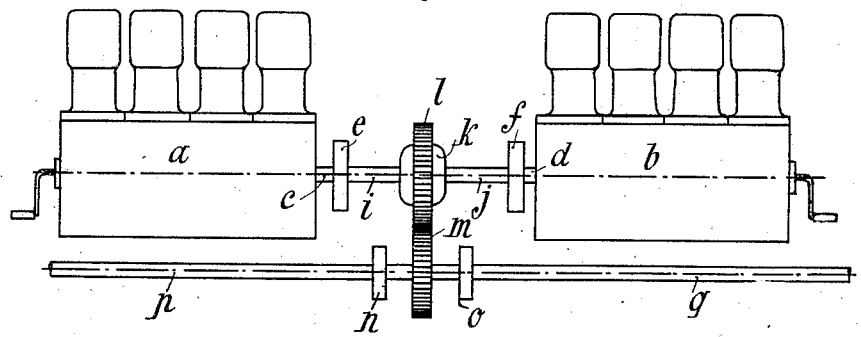
Figure 3:
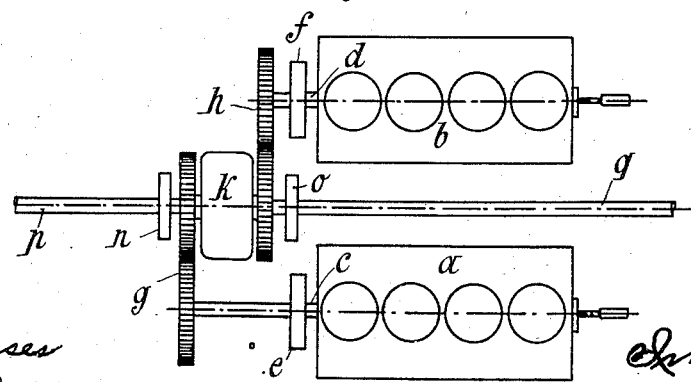

In the accompanying drawing given merely by way of example, Figure 1 is a construction of the system of transmission according to this invention, Fig. 2 is another construction, and Fig. 3 shows a third construction in plan, in case of the combination of two motors mounted in parallel.

The motor apparatus comprises a motor $a$ of great power driving the main propeller, and an auxiliary or emergency motor $b$ driving the secondary propeller. In the example shown in Fig. 1, the two motors $a\ b$ are arranged in the longitudinal axis of the car and are mounted in opposition, the ends comprising the starting handle being arranged face to face. On the main shafts $c\ d$ of each motor $a\ b$ are mounted clutches $e\ f$ of any suitable kind which, by means of counter-shaft gearings $g\ h$ enable the intermediate spindles $i\ j$ acting as the transverse spindles of any differential mechanism $k$ to be driven at will.

The differential mechanism $k$ operates by means of its toothed outer rim $l$, a toothed wheel $m$ transmitting the movement by means of any two clutches $n\ o$ to two spindles $p\ q$ each respectively driving propellers either direct or by means of any suitable reducing gear.

When the clutches $e\ f\ n$ and $o$ are all in engagement, the motors $a\ b$ working in a normal manner, act on the differential mechanism $k$ which operates to balance the speeds of the two motors $a\ b$ for operating the two propellers. The combined propellers operate then so as to impart to the airship a great speed.

In order to operate each propeller by means of its own motor, when the other motor group is stationary one of the motor clutches $e$ or $f$ and also the clutch $n$ or $o$ of the corresponding propeller are disengaged, and finally the differential gear is stopped so as to enable it to be driven without any reduction of speed.

In order to stop the differential gear it is necessary to connect the shafts $i$ and $j$ by gearing controlled by suitable mechanism. As the action of the differential gear is stopped, the driving of the propeller by its motor is effected normally, that is to say, the transmission of the movement is effected as if the gear wheel were keyed directly on one of the shafts $j$ or $i$; the movement being transmitted directly to the pinion $m$ which is keyed on the shaft $p$ or $q$ of the propeller. Instead of using the gears $e, f$, for coupling or uncoupling the connection between the one or the other of the motors and the shafts $i$, $j$, ending at the differential gear $k$, the transmission pinions $g$, $h$, might be mounted so that, as desired, they could be moved longitudinally on the driving shaft in the rotation of which they participate. If, on the contrary, one of the motors for instance $a$ meets with an accident, and the propeller connected to the shaft $q$ of the other group is damaged the active propeller shaft $p$ can be driven by the other motor $b$ remaining in action. It is sufficient to that end to throw out of gear the motor $a$ and the propeller shaft $q$ by disengaging the suitable clutches $e$ and $o$ and to brake the differential mechanism so as to obviate its effect. The two motors $a$ and $b$ together can be made to act on one and the same propeller shaft $p$ or $q$ and to that end the two motors $a$ and $b$ thrown into gear act on the differential mechanism $k$, the propelling group not used being stopped. Finally the two propellers can be driven by either of the two motors. For that purpose, if for instance the motor $b$ is out of action, it is sufficient to disengage the clutch $f$, and to stop the action of the differential gear.

The coupling of the motors to, and uncoupling from the differential, can be obtained by mounting one of the counter-shaft pinions $g$ $h$ in a longitudinally adjustable manner on the spindle to which it is secured. By connecting as shown the motors $a$ $b$ to the differential $k$ by means of intermediate spindles $i$ $j$ mounted by means of universal joints, the motors $a$ $b$ can be mounted on elastic suspension devices absorbing shocks, the differential mechanism $k$ being rigidly secured to the framework of the car. In the modified construction shown in Fig. 2, the motors $a$ $b$ are also arranged symmetrically in the longitudinal axis of the car, but the faces provided with the starting handles are outside. The working is identical with that previously described, the transmission between the driving shafts $c$ $d$ and the differential $k$ can be again obtained by means of secondary spindles mounted by means of a universal joint between the parts in question, so as to enable the said motors $a$ $b$ to be elastically suspended.

In the modified construction shown in Fig. 3, the motors $a$ $b$ are parallel and arranged symmetrically relatively to the longitudinal symmetrical plane of the car. They drive by means of suitable countershafts $g$ $h$, the differential $k$ operating the respective shafts $p$ $q$ of the propellers. With this modified arrangement of the whole motor group it is possible to set the same combinations as those described.

It is obvious that the above mentioned transmission device could also be combined with motors of an equal power acting on identical propelling groups, and that the clutches could be operated automatically by the stopping or getting out of order of the motor groups or of the corresponding propelling group.

What I claim as my invention and desire to secure by Letters Patent is:—

In an airship the combination of two distinct propelling groups, two distinct driving mechanisms for said propelling groups, a differential mechanism arranged between said driving mechanisms and said propelling groups, and clutches arranged between each of the driving mechanisms and said differential mechanism and each of the propelling groups, and the said differential mechanism.

In testimony whereof I have signed my name to this specification in the presence of two subscribing witnesses.

EDOUARD SURCOUF.

Witnesses:
VICTOR DUPOY,
GEORGES BONNEUIL.